United States Patent

Kanitz et al.

[11] Patent Number: 6,126,867
[45] Date of Patent: Oct. 3, 2000

[54] NONLINEAR-OPTICALLY ACTIVE COPOLYMERS, POLYMER MATERIALS PRODUCED FROM THEM, AND ELECTROOPTICAL AND PHOTONIC COMPONENTS CONSTRUCTED THEREFROM

[75] Inventors: Andreas Kanitz, Hoechstadt; Christian Fricke, Berlin, both of Germany

[73] Assignee: Siemens Aktiengesellschaft, Munich, Germany

[21] Appl. No.: 09/265,441

[22] Filed: Mar. 9, 1999

[30] Foreign Application Priority Data

Mar. 9, 1998 [DE] Germany ................ 198 10 064

[51] Int. Cl.[7] ............... F21V 9/00; G02F 1/35; C08F 26/06
[52] U.S. Cl. ............ 252/582; 525/326.7; 525/333.3; 525/342; 528/392; 528/396; 359/328
[58] Field of Search ............ 252/582; 525/326.7, 525/333.3, 342; 528/392, 396; 359/328

[56] References Cited

U.S. PATENT DOCUMENTS

| | | |
|---|---|---|
| 4,796,976 | 1/1989 | Leslie et al. . |
| 4,847,327 | 7/1989 | Rupp et al. ............... 525/326.7 |
| 4,915,491 | 4/1990 | DeMartino et al. . |
| 4,935,292 | 6/1990 | Marks et al. ............... 252/582 |
| 5,834,575 | 11/1998 | Honda et al. ............... 525/326.7 |

FOREIGN PATENT DOCUMENTS

| | | |
|---|---|---|
| 0 350 112 A1 | 1/1990 | European Pat. Off. . |
| 43 12 243 A1 | 10/1993 | Germany . |
| 2 267 095 | 11/1993 | United Kingdom . |

OTHER PUBLICATIONS

Tobin J. Marks: "Entwurf, Synthese und Eigenschaften von Molekülaggregaten mit ausgeprägten nichtlinearen optischen Eigenschaften zweiter Ordnung", Ange. Chem., 1995 pp. 167–187, draft, synthesis and properties of molecular aggregates having distinctive nonlinear optical characteristics of the second order.

J. D. Swalen et al.: "Poled Epoxy Polymers For Optoelectronics" in J. Messier et al. (ed.): "Organic Molecules for Nonlinear Optics and Photonics", Kluwer Academic Publishers, Dordrecht, 1991, pp. 433–445.

K. D. Singer et al: "Orientally Ordered Electro–Optic Materials", in Paras N. Prasad et al.: "Nonlinear Optical and Electroactive Polymers", Plenum Press, New York, 1988, pp. 189–204.

*Primary Examiner*—Philip Tucker
*Attorney, Agent, or Firm*—Herbert L. Lerner; Laurence A. Greenberg; Werner H. Stemer

[57] ABSTRACT

The invention relates to nonlinear-optically active copolymers, to crosslinked NLO polymer materials produced from them and having high orientation stability, and to electrooptical and photonic components comprising these polymer materials. The copolymers of the invention are of the general formula 1

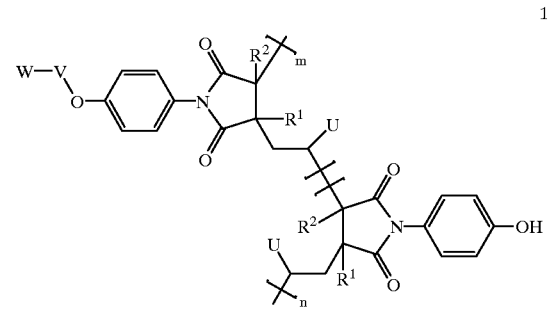

in which W is preferably a chromophoric group of the general formula 2:

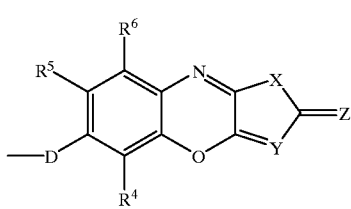

The chromophores employed in accordance with the invention exhibit high thermal stability and so can be processed at elevated temperatures while retaining the optical activity.

18 Claims, No Drawings

NONLINEAR-OPTICALLY ACTIVE COPOLYMERS, POLYMER MATERIALS PRODUCED FROM THEM, AND ELECTROOPTICAL AND PHOTONIC COMPONENTS CONSTRUCTED THEREFROM

BACKGROUND OF THE INVENTION

1. Field of the Invention

This invention relates to novel nonlinear-active copolymer and electrooptical and photonic components constructed therefrom.

2. Description of the Related Art

Polymers having nonlinear-optical properties are known and used, for example, as electrooptical switches, and are employed in areas of information processing and of integrated optics, such as optical chip-to-chip connections, waveguiding in electrooptical layers, Mach-Zehnder interferometers, and optical signal processing in sensor technology.

An overview of current problems in the development of materials having pronounced nonlinear-optical (NLO) properties is given in Angewandte Chemie, Vol. 107 (1995), pages 167 to 187. In addition to the requirements which are necessarily made of nonlinear-optical chromophores, reference is made to the problems in the development of polymeric matrices for the embedding of the chromophores and for their orientation-stable alignment.

So that polymers which are provided with covalently bonded or dissolved nonlinear-optical chromophores become nonlinear-optically active and exhibit high 2nd-order susceptibility, the chromophores must be oriented in an electrical field. In this context, reference is made to J. D. Swalen et al. in J. Messier, F. Kajzar, P. Prasad "Organic Molecules for Nonlinear Optics and Photonics", Kluwer Academic Publishers 1991, pages 433 to 445. This orientation usually takes place in the region of the glass transition temperature, where the mobility of the chain segments of the polymers allows orientation of the nonlinear-optical chromophores. The orientation obtained in the field is then frozen in by cooling or, better still, by crosslinking of the polymer. The 2nd-order susceptibility $X^{(2)}$ that can be achieved here is proportional to the spatial density of the hyperpolarizability $\beta$, to the ground-state dipole moment $\mu_0$ of the chromophores, to the electrical poling field, and to parameters which describe the distribution of orientation after the poling process. In this context, reference is made to K. D. Singer et al. in P. N. Prasad, D. R. Ulrich "Nonlinear Optical and Electroactive Polymers", Plenum Press, New York 1988, pages 189 to 204.

Great interest attaches to compounds which combine a high dipole moment with high values of $\mu$. Consequently, investigations have been carried out in particular into chromophores consisting of conjugated n-electron systems which carry an electron donor at one end of the molecule and an electron acceptor at the other end and are bonded covalently to a polymer: for example, to polymethyl methacrylate (U.S. Pat. No. 4,915,491), polyurethane, (EP-A 0 350 112) or polysiloxane (U.S. Pat. No. 4,796,976).

The above-mentioned polymer materials, known in the prior art, which have nonlinear-optical properties possess the disadvantage that there is relaxation of the oriented chromophore units and thus a loss of the nonlinear-optical activity. At present, this relaxation is still preventing the production of electrooptical components of long-term stability that are deployable technically.

A further disadvantage of the known polymer materials having nonlinear-optical properties is that it is impossible to modify the magnitude of the NLO coefficient and other important parameters, such as refractive index and glass transition temperature. Furthermore, owing to their chemical structure, the chromophoric systems described to date lack sufficient thermal stability to withstand without damage the thermal stresses which occur during the production and/or use of the electrooptical and photonic components. For instance, even at 85° C. there is a marked drop in the measured electrooptical coefficients as a result of the relaxation processes of the chromophores in the polymer matrix.

What would be desirable would be stability of these optical coefficients at temperatures above 100° C., and for this reason there is a simultaneous requirement for a substantially higher glass transition temperature of the polymeric material.

SUMMARY OF THE INVENTION

It is the object of the present invention, accordingly, to develop polymeric materials having stable nonlinear-optical activity. The intention is, in particular, to provide materials with which relaxation of the chromophores up to temperatures of more than 100° C. is prevented and whose chromophoric constituents possess long-term thermooxidative stability at temperatures above 200° C.

It has been possible to achieve these objects with the present invention.

The present invention accordingly provides nonlinear-optically active copolymers of the general formula 1

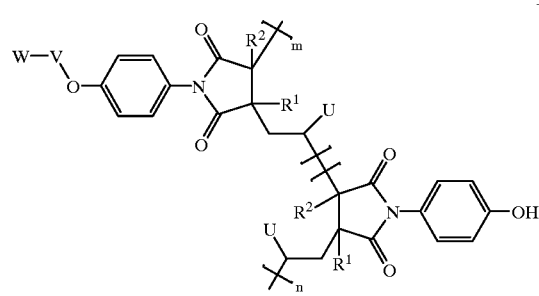

wherein:

R$^1$, R$^2$ are, independently of one another, H, CH$_3$ or halogen;

U is a linear or branched C$_1$- to C$_{20}$-alkyl radical, a C$_5$- to C$_7$-cycloalkyl radical, a bi- or tricyclic alkyl radical having up to 18 carbon atoms, an aryl or heteroaryl radical, or an alkyl-substituted silane radical of the structure —(CH$_2$)$_n$—Si (R', R", R''') where n=1 to 5 and R', R", R'''=C$_1$- to C$_5$-alkyl;

V is a linear or branched hydrocarbon chain having 2 to 20 carbon atoms, where one or more nonadjacent CH$_2$ groups, with the exception of the CH$_2$ group providing the link to the radical W, can be replaced by O, S or NR$^3$, where R$^3$ is H or a linear or branched C$_1$- to C$_6$-alkyl radical;

W is a nonlinear-optically active group; and m:n=5:95 to 95:5.

The nonlinear-optically active group W can, for example, be a chromophore of the type of the azo dyes, stilbene dyes or polymethine dyes. Preferably, the group W has a structure of the general formula 2

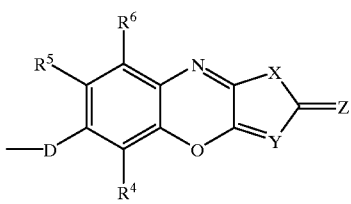

which is attached by D to V and where

D is O, S or $NR^7$, where $R^7$ is a hydrogen atom, a linear or branched $C_1$- to $C_{20}$-alkyl radical which is uninterrupted or interrupted by 1 to 5 ether oxygen atoms, a benzyl radical or a phenyl or naphthyl radical, or $R^7$ and V, together with the nitrogen atom connecting them, form a pyrrolidinyl, piperidinyl, morpholinyl or piperazinyl radical, $R^4$, $R^5$, $R^6$ are independently of one another a hydrogen atom, a linear or branched $C_1$- to $C_{20}$-alkyl radical which is uninterrupted or interrupted by 1 to 5 ether oxygen atoms, or are a phenyl, naphthyl, thienyl, thiazolyl or pyridyl radical, Z is an electron-acceptor-substituted methylene or imino group, X is S, O, $NR^8$ or a ring double bond or is

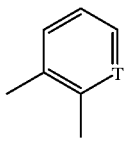

where $R^8$ is a hydrogen atom, a linear or branched $C_1$- to $C_{20}$-alkyl radical or a phenyl or naphthyl radical and T is CH or N, or Z and T together form a structure of the type $=N-SO_2-C\equiv$, $=N-CS-C\equiv$ or $=N-CO-C\equiv$, and Y is a CH or $CR^9$ group or is N, where $R^9$ is a linear or branched $C_1$- to $C_{20}$-alkyl radical, a phenyl radical or a naphthyl radical.

The chromophoric group W in these copolymers exhibits thermooxidative stability to more than 200° C., and the embedding of this chromophoric group in the polymeric matrix system of the invention, surprisingly, permits wide variation of the optical properties.

DESCRIPTION OF THE PREFERRED EMBODIMENTS

In a preferred embodiment of the present invention the substituents $R^1$ and $R^2$ are a hydrogen atom. The radical V is preferably a $C_2$- to $C_6$-hydrocarbon radical. The radical U is derived in general from a U-substituted vinyl compound; suitable radicals U are, in principle, all radicals which bring about a high glass transition temperature. Suitable aryl radicals for U are phenyl and naphthyl radicals, suitable heteroaryl radicals are thienyl, thiazolyl and pyridyl radicals; bi- or tricyclic alkyl radicals are, in particular, norbornyl and adamantyl radicals. Particularly suitable copolymers for the purposes of the invention result if U is a $C_6$- to $C_{10}$-alkyl group, a $C_6$-cycloalkyl group, a phenyl radical or a silyl group of the general formula $—(CH_2)_n—Si (R', R'', R''')$, where n=1 and R', R'' and R''', independently of one another, are $C_1$- to $C_5$-alkyl groups.

In the chromophoric constituent W, the radical Z is preferably a dicyanomethylene, alkoxycarbonylcyanomethylene, cyanoimino or alkoxycarbonylimino group. The group Y is preferably CH and the group X is preferably a 1,2-fused benzene ring.

For the chromophoric compounds used in accordance with the present invention, reference is also made to the simultaneously filed German Patent Application 198 10 030.2 ("Chromophoric compounds and process for preparing them"). Within the copolymers, the chromophoric compounds make up a proportion of from 5 to 95 mol %, preferably from 20 to 50 mol %.

The nonlinear-optically active copolymers represented by Formula 1 according to the present invention are amorphous copolymers made up of comonomer units bearing the substituent U and substituted N-(hydroxyphenyl)succinimide comonomer units arranged in strict alternation, in which the latter units have covalently bonded nonlinear-optical groups W and crosslinking-active functional groups in desired ratios as expressed by m and n.

The preparation of the copolymers (by reactions including free-radical polymerization and/or imidizing condensation), and also the synthesis of the chromophores and their precursors and the chemical attachment of the chromophores to the base polymer matrix, either take place in accordance with conventional processes and/or are described in the Working Examples.

The free-radical polymerization is able to take place by means of free-radical initiators which decompose on heating. Initiators of this kind which are used are preferably azoisobutyronitrile and per compounds, such as dibenzoyl peroxide.

Using the nonlinear-optical copolymers of the invention it is possible to produce polymer materials and, respectively, electrooptical and photonic components having stable nonlinear-optical properties.

Accordingly, the present invention additionally provides NLO polymer materials having stable nonlinear-optical properties, which are composed of a nonlinear-optically active copolymer of the above type (having crosslinkable free phenolic hydroxyl groups) and a crosslinker, there being 1/n gram equivalent of an n-functionalized crosslinker per gram equivalent of crosslinkable free hydroxyl groups of the nonlinear-optical copolymer.

The following classes of compounds may function, optionally, as the crosslinking-active components:

a) bi- or oligo-functionalized aliphatic and aromatic glycidyl ethers which add the free phenolic hydroxyl groups by ring opening and ether formation; preferred glycidyl ethers include bisphenol-a bis(glycidyl ether), glycerol propoxylate tris(glycidyl ether), and poly-[(ortho-cresyl-2,3-epoxypropyl ether) -co-formaldehyde]

b) bi- or oligo-functionalized aliphatic and aromatic isocyanates or isothiocyanates, which add the free phenolic hydroxyl groups by urethane formation; preferred isocyanates and isothiocyanates include toluene-2,4-diisocyanate, 1,4-phenylenediisocyanate, and diphenylmethanediisocyanate c) bifunctional anhydrides together with any desired nonvolatile oxirane derivative, in which case crosslinking takes place by ester formation as the anhydride adds to the free phenolic hydroxyl groups and the resulting carboxyl groups add to the oxirane groups; preferred anhydrides include poly(styrene-alt-maleic anhydride), isopropylidenebis(phthalic anhydride), hexafluoroisopropylidenebis(phthalic anhydride) and benzenetetracarboxylic acid anhydride.

In order to improve the surface quality, processibility and/or compatibility with polymers, it is possible to add processing auxiliaries to the polymeric materials of the invention, depending on the intended application. Examples of these auxiliaries are thixotropic agents, flow-control agents, plasticizers, wetting agents, lubricants and binders.

The NLO polymer materials according to the invention are applied in solution together with the crosslinking-active compounds to a substrate, by spin coating, dipping, printing or brushing. This produces a nonlinear-optical arrangement, in which the polymeric materials are subjected to dipolar alignment in electrical fields, during slow heating to the glass transition temperature, and, directly thereafter, crosslinking takes place under kinetic control. After cooling, polymer materials having excellent nonlinear-optical properties and, owing to the crosslinking, increased orientation stability and thus increased long-term stability, even at elevated service temperatures, are obtained. The polymer materials having nonlinear-optical properties according to the present invention have stability and modifiability which makes them suitable for producing electrooptical and photonic components which are used in nonlinear optics.

The present invention therefore additionally provides electrooptical and photonic components which comprise at least one functional layer of the crosslinked, nonlinear-optical polymer material of the invention.

In order to produce the functional layer, it is preferred to apply a nonlinear-optical copolymer according to the invention, together with a suitable crosslinker, to an appropriate support material, such as glass, ITO-coated glass (ITO=indium-tin oxide) or silicon wafers, by means, for example, of spin coating or any other techniques suitable for producing thin films. Crosslinking is then conducted in an appropriate manner at elevated temperature, with or without simultaneous polar alignment. Regarding the precise procedure, reference is made to the following examples.

In one preferred embodiment of the present invention the functional layer produced from NLO material is not applied directly to the support material but is arranged between two buffer layers. The purpose of the buffer layers is to decouple the optical signal from the electrodes, so as to minimize the attenuation. Preferably, the buffer layers are formed from a corresponding crosslinked NLO polymer material, but with a lower chromophore content.

Other features which are considered as characteristic for the invention are set forth in the appended claims.

Although the invention is illustrated and described herein as embodied in nonlinear-optically active copolymers, polymer materials produced from them, and electrooptical and photonic components constructed therefrom, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments.

In the text below, the invention is elucidated in more detail by means of Working Examples, in which first of all the synthesis of the nonlinear-optically active compounds is shown, followed by the synthesis of the copolymers that are used in the context of the invention, and the introduction of the nonlinear-optically active chromophores into the copolymers, and, finally, by the synthesis of the nonlinear-optically active polymer materials.

The following abbreviations are used in the Examples:

m.p.=melting point;

b.p.=boiling point;

decomp.=decomposition.

EXAMPLE 1 a) 0.11 mol of n-butyl bromide and 0.1 mol $NaHCO_3$ are added to 0.1 mol of m-aminophenol in 150 ml of methanol, and the mixture is refluxed for 5 h. After cooling, it is filtered and the solvent is removed in vacuo. The oil which remains is fractionated in vacuo, to give 3-(n-butylamino)phenol.

Yield: 57%; b.p. 110° C. ($6·10^{-5}$ torr); m.p. 35° C.

b) 0.1 mol of 3-(n-butylamino)phenol in 100 ml of methanol is refluxed for 10 h with 0.11 mol of 2-bromoethanol and 0.1 mol of $NaHCO_3$. After cooling, the mixture is filtered, the solvent is removed in vacuo, and the residue is fractionated, to give 3-[N-(n-butyl)-N-(2-hydroxyethyl)amino]phenol.

Yield: 54%, b.p. 130–140° C. ($5·10^{-5}$ torr); m.p. 45–47° C.

c) 0.05 mol of the compound of b) is dissolved in 50 ml of HCl-saturated propanol, and 0.1 mol of isoamyl nitrite is added. After 20 minutes, 150 ml of diethyl ether are added, and the product which has formed is filtered off with suction, to give 2-nitroso-5-[N-(n-butyl)-N-(2-hydroxyethyl) amino]-phenol hydrochloride.

Yield: 76%; m.p. 127° C. (decomp.).

d) 0.01 mol of the compound of c) is briefly heated to boiling with 0.011 mol of 1-naphthylmalonitrile and 0.02 mol of triethylamine in 15 ml of dimethylformamide. After the mixture has cooled, water is added and the product which precipitates is extracted with dichloroethane. Following distillative removal of the solvent, the residue is purified by repeated chromatography over silica gel using ethyl acetate as eluent, to give benzo[a]-5-dicyanomethylene-9-[N-(n-butyl)-N-(2-hydroxyethyl)amino]-7,12-phenoxazine, a compound of the following structure:

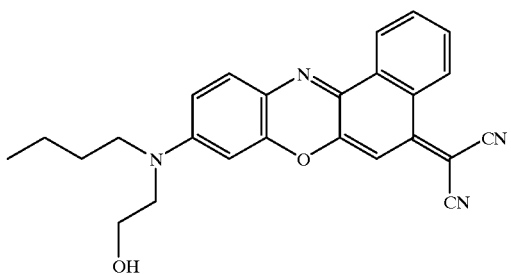

Yield: 30%; m.p. 190° C.; $\lambda_{max}$ 618 nm (in toluene)

EXAMPLE 2 a) 0.11 mol of n-heptyl bromide and 0.1 mol of $NaHCO_3$ are added to 0.1 mol of m-aminophenol in 150 ml of methanol, and the mixture is refluxed for 5 h. After cooling, it is filtered and the solvent is removed in vacuo. The oil which remains is fractionated in vacuo, to give 3-(n-heptyl-amino)phenol.

Yield: 62%; b.p. 130–140° C. ($8·10^{-5}$ torr); m.p. 27–30° C.

b) 0.1 mol of 3-(n-heptylamino)phenol in 100 ml of methanol is refluxed for 10 h with 0.11 mol of 2-bromoethanol and 0.1 mol of $NaHCO_3$. After cooling, the mixture is filtered, the solvent is removed in vacuo, and the residue is fractionated, to give 3-[N- (n-heptyl)-N-(2-hydroxyethyl) -amino]phenol.

Yield: 54%, b.p. 160–170° C. ($1·10^{-5}$ torr); m.p. 45–47° C.

c) 0.05 mol of the compound of b) is dissolved in 50 ml of HCl-saturated propanol, and 0.1 mol of isoamyl nitrite is added. After 20 minutes, 150 ml of diethyl ether are added, and the product which has formed is filtered off with suction, to give 2-nitroso-5-[N-(n-heptyl)-N-(2-hydroxyethyl)-amino]phenol hydrochloride.

Yield: 62%; m.p. 129° C. (decomp.).

d) 0.01 mol of the compound of c) is briefly heated to boiling with 0.011 mol of 1-naphthylmalonitrile and 0.02 mol of triethylamine in 15 ml of dimethylformamide. After the mixture has cooled, water is added and the product which precipitates is extracted with dichloroethane. Following distillative removal of the solvent, the residue is purified by repeated chromatography over silica gel using ethyl acetate as eluent, to give benzo[a]-5-dicyanomethylene-9-[N-(n-heptyl)-N-(2-hydroxyethyl)amino]-7,12-phenoxazine, a compound of the following structure:

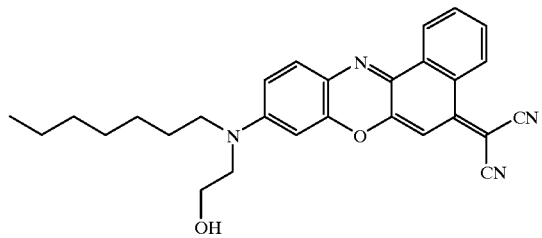

Yield: 28%; m.p. 155–157° C.; $\lambda_{max}$ 622 nm (in toluene).

EXAMPLE 3

In analogy to Example 1, 2-dicyanomethylene-6-[N-(n-butyl)-N-(2-hydroxyethyl)amino]thieno[3,2-b]benzo[e]-oxazine of the formula

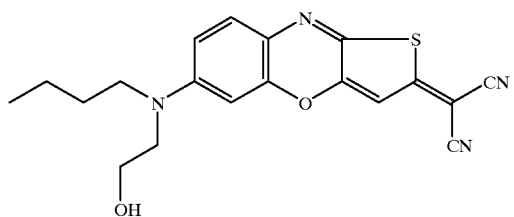

is prepared by refluxing 0.01 mol of 2-nitroso-5-[N-(n-butyl)—N-(2-hydroxyethyl)amino]phenol hydrochloride (see Example 1c) with 0.01 mol of 2-thienylmalonitrile, which was prepared by reacting 0.13 mol of malononitrile in 100 ml of absolute tetrahydrofuran with 0.15 mol of sodium hydride, 0.0015 mol of $[(C_6H_5)_3P]_2PdCl_2$ and 25 g of 2-iodothiophene by boiling under reflux for 3 hours followed by neutralization with hydrochloric acid in a yield of 45%, in 15 ml of dimethylformamide to which 0.02 mol of triethylamine has been added, for a number of minutes. After the resulting solution has been cooled, it is diluted with water and the dye which has precipitated in the course of dilution is isolated by filtration with suction. Purification takes place by repeated column chromatography over silica gel with ethyl acetate as eluent.

Yield 23%; m.p. 2600° C.

EXAMPLE 4

In accordance with Example 2, 2-nitroso-5-[N-(n-heptyl)-N-(2-hydroxyethyl)amino]phenol hydrochloride (see Example 2c) and 1,8-naphthosultam are used to prepare 9-[N-(n-heptyl)-N-(2-hydroxyethyl)amino]benzo-[d] isothiazolo[3,3a,4-ab]phen-7,12-oxazine 4-dioxide, a phenoxazine dye of the following structure (yield 35%; m.p. 178–180° C.):

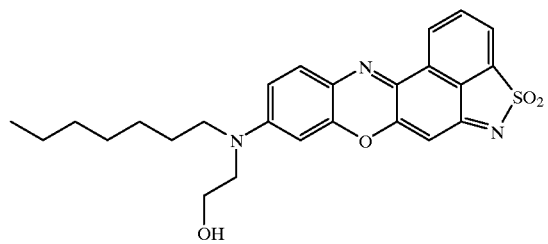

EXAMPLE 5

In accordance with Example 3, 2-nitroso-5-[N-(n-butyl)-N-(2-hydroxyethyl)amino]phenol hydrochloride (see Example 1c) and N-cyano-1-naphthylamine are used to prepare benzo[a]-5-cyanoimino-9-[N-(n-butyl)-N-(2-hydroxyethyl)amino]-7, 12-phenoxazine, a phenoxazine dye of the following structure (yield 25%; m.p. 173–175° C.):

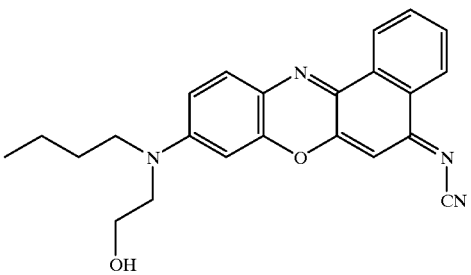

EXAMPLE 6

In accordance with Example 3, 2-nitroso-5-[N-(n-butyl)-N-(2-hydroxyethyl)amino]phenol hydrochloride (see Example 1c) and 8-cyanoaminoquinoline are used to prepare pyridino[2,3-a]-5-cyanoimino-9-[N-(n-butyl)-N-(2-hydroxyethyl)amino]-7,12-phenoxazine, a phenoxazine dye of the following structure (yield 32%; m.p. 185–187° C.):

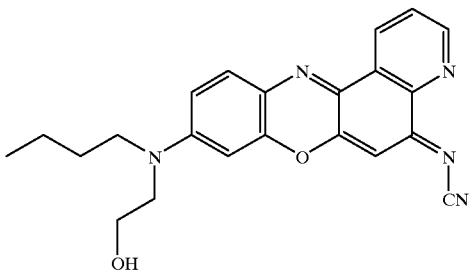

Synthesis of Copolymers a) Free-radical Polymerization

EXAMPLE 7

Under absolutely anhydrous conditions and with oxygen-free inert gas flushing, 0.5 mol of maleic anhydride and 0.5 mol of trimethylallylsilane are dissolved in 500 ml of dioxane, 2 mol % of azoisobutyronitrile is added (as a free-radical initiator), and the system is brought to reaction with stirring and thermostating at 50° C. for 10 h. Subsequently, the solvent is removed completely in vacuo on a rotary evaporator, to give a copolymer of the following structure in quantitative yield ($T_g$: 200° C.):

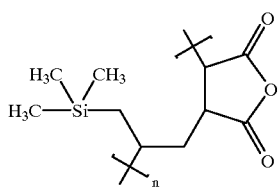

EXAMPLE 8

In accordance with Example 7, maleic anhydride and styrene are reacted to give a copolymer of the following structure in quantitative yield ($T_g$: 185° C.):

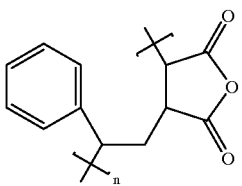

b) Imidizing Condensation

EXAMPLE 9

21.4 g of the copolymer prepared in Example 7 are dissolved with stirring in 40 ml of dimethylformamide, and then 10.9 g of p-aminophenol, dissolved in 20 ml of dimethylformamide, are added. Following a reaction period of 30 minutes, a mixture of 40 ml of acetic anhydride and 20 ml of pyridine is added, after which the mixture is stirred at 90° C. for 4 h. After cooling, the copolymer solution is introduced dropwise into 1.5 l of methanol, with vigorous stirring, in order to precipitate the reaction product of the following structure, which is then filtered off with suction and dried. ($T_g$: 180° C., yield: 85%).

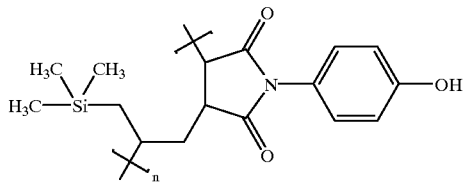

EXAMPLE 10

In accordance with Example 9, 20.2 g of the copolymer prepared in Example 8 are used to prepare a copolymer of the following structure ($T_g$: 150° C., yield: 80%):

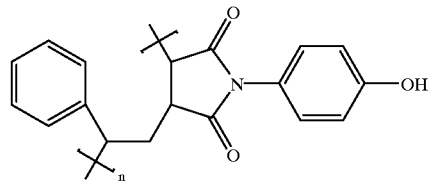

Synthesis of Copolymers Comprising Nonlinear-Optically Active Chromophores

EXAMPLE 11

8.8 g of the copolymer of Example 10 (30 mmol) are dissolved with stirring in 150 ml of N-methyl-pyrrolidone (NMP), with exclusion of moisture and inert gas flushing, and with 6 g of the chromophore from Example 1 (15 mmol=50 mol %) and 8 g of triphenylphosphine (30 mmol). Thereafter, 5 ml of diethyl azodicarboxylate (30 mmol), dissolved in 25 ml of NMP, are slowly added dropwise; stirring is continued for 8 h in order to complete the reaction. Subsequently, the polymer solution is introduced dropwise into methanol, with vigorous stirring, in order to precipitate the reaction product, which is then filtered off with suction and dried. The crude product is dissolved completely by adding tetrahydrofuran and is purified by repeated reprecipitation from methanol, to give a chromophore-containing copolymer of the following structure:

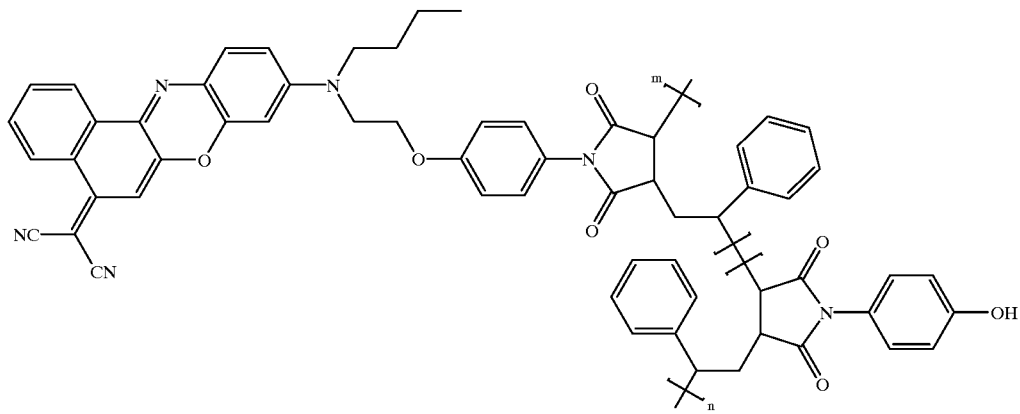

n:m = 1:1

The results are summarized in Table 1.

EXAMPLE 12

In accordance with Example 11, 9.1 g of the copolymer from example 9 (30 mmol) and 6.8 g of the chromophore from Example 2 (15 mmol=50 mol %) are used to give a chromophore-containing polymer of the following structure:

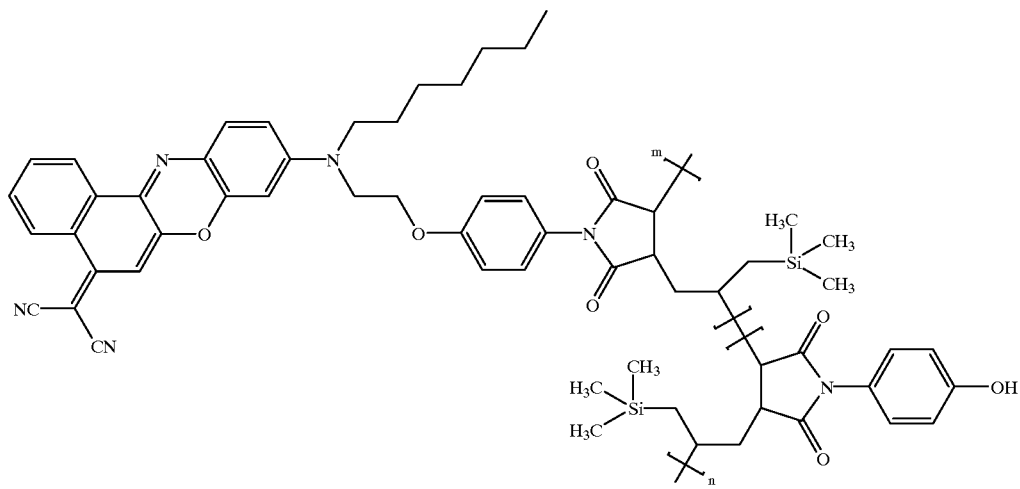

n:m = 1:1

The results are summarized in Table 1.

TABLE 1

| Polymer of | m:n ratio (mol %) | Yield % | $T_g$ ° C. |
|---|---|---|---|
| Example 11 | 50:50 | 82 | 135 |
| Example 12 | 50:50 | 79 | 150 |

Crosslinking of the Nonlinear-Optically Active Polymeric Material

EXAMPLE 13

For crosslinking, the nonlinear-optically active copolymer from Example 12, together with the crosslinker bisphenol-A-bisglycidyl ether (BPABGE), is applied to suitable support materials, such as glass, ITO-coated glass (ITO= indium-tin oxide) or silicon wafers, by spin coating from a solution, preferably in cyclohexanone, and is freed from the solvent in vacuo at elevated temperature, preferably at 70° C. for 15 h. Subsequently, the substrate is provided with a covering electrode and is slowly heated in an electrical DC field to the glass transition temperature of the respective material; in the course of heating, the material of the coating is subjected to dipolar alignment and is simultaneously crosslinked. The reaction conditions and the results thus obtained are summarized in Table 2 ($T_g$=glass transition temperature).

EXAMPLE 14

In accordance with Example 13, the nonlinear-optically active copolymer from Example 11, together with the crosslinker p-phenylene diisocyanate (p-PDIC), is processed to form a component. The reaction conditions and the results obtained are summarized in Table 2.

TABLE 2

| Polymer of | Crosslinker | Crosslinking temperature | $T_g$ after crosslinking | $r^{33}$ (pm/V) |
|---|---|---|---|---|
| Example 13 | BPABGE | 180–230° C. | none up to 300° C. | 48 |
| Example 14 | p-PDIC | 120–180° C. | None up to 300° C. | 46 |

The $r^{33}$-value in pm/V is a measure of the capacity of an NLO modulator. For azo dyes, for example those of the type "Disperse Red", the maximum values attained are 10 pm/V.

EXAMPLE 15

Electrooptical Investigations

For the electrooptical investigations, films with a customary film thickness of from 2 to 6 μm are produced from the polymeric materials of the invention. For the electrical poling, for obtaining a high noncentro-symmetrical orientation, a gold electrode is applied by sputtering to the film of the polymeric material; the counterelectrode is a transparent ITO layer. While the sample is heated to the region of the glass transition temperature, a direct voltage is applied, with the increase in voltage required being tailored to the orientation behavior of the nonlinear-optical molecule units in order to avoid electrical breakdown and thus destruction of the film. After a poling field strength of from 100 to 200 V/μm has been reached, a poling period of about 30 minutes is sufficient to orient the nonlinear-optical molecule units. The sample is subsequently cooled to room temperature with a constantly applied field, thereby fixing the orientation.

The electrooptical investigations of the polymer samples are made by interferometric measurement of a laser beam, beamed in obliquely, after single reflection at the gold electrode. The measurement setup required for this purpose, and the evaluation of the measurement, are known (see, for example: Appl. Phys. Lett., Vol. 56 (1990), pages 1734 to 1736).

The copolymers and crosslinked polymer materials of the invention exhibit high orientation stability following polarization. The chromophores contained in them show excellent temperature stability, so that the materials are suitable for producing electrooptical and photonic components of long-term stability that are deployable technically.

We claim:

1. A nonlinear-optically active copolymer of the general formula 1

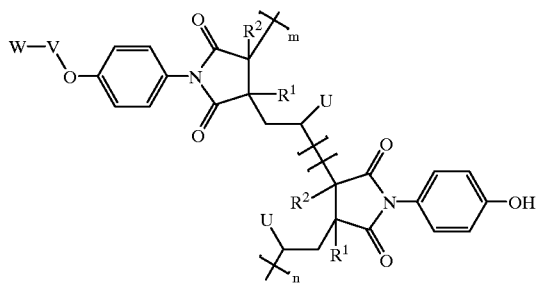

wherein:

$R^1$, $R^2$ are, independently of one another, H, $CH_3$ or halogen;

U is a linear or branched $C_1$- to $C_{20}$-alkyl radical, a $C_5$- to $C_7$-cycloalkyl radical, a bi- or tricyclic alkyl radical having up to 18 carbon atoms, an aryl or heteroaryl radical, or an alkyl-substituted silane radical of the structure $(CH_2)_x$-Si(R', R", R''') where x=1 to 5 and R', R", R'''=$C_1$- to $C_5$-alkyl;

V is a linear or branched hydrocarbon chain having 2 to 20 carbon atoms, where one or more nonadjacent $CH_2$ groups, with the exception of the $CH_2$ group providing the link to the radical W, can be replaced by O, S or $NR^3$, where $R^3$ is H or a linear or branched $C_1$- to $C_6$-alkyl radical;

W is a nonlinear-optically active group; and m:n=5:95 to 95:5.

2. A copolymer as claimed in claim 1, in which W is a nonlinear-optically active group of the general formula 2:

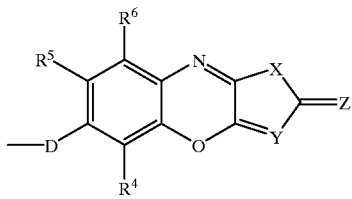

which is attached by D to V and where

D is O, S or $NR^7$, where $R^7$ is a hydrogen atom, a linear or branched $C_1$- to $C_{20}$-alkyl radical which is uninterrupted or interrupted by 1 to 5 ether oxygen atoms, a benzyl radical or a phenyl or naphthyl radical, or $R^7$ and V, together with the nitrogen atom connecting them, form a pyrrolidinyl, piperidinyl, morpholinyl or piperazinyl radical, $R^4$, $R^5$, $R^6$ are each a hydrogen atom, a linear or branched $C_1$- to $C_{20}$-alkyl radical which is uninterrupted or interrupted by 1 to 5 ether oxygen atoms, or are a phenyl, naphthyl, thienyl, thiazolyl or pyridyl radical, Z is an electron-acceptor-substituted methylene or imino group, X is S, O, $NR^8$ or a ring double bond or is

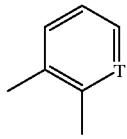

where $R^8$ is a hydrogen atom, a linear or branched $C_1$- to $C_{20}$-alkyl radical or a phenyl or naphthyl radical and T is CH or N, or Z and T together form a structure of the type =N-$SO_2$-C≡, =N—CS—C≡ or =N—CO—C≡, and Y is a CH or $CR^9$ group or is N, where $R^9$ is a linear or branched $C_1$- to $C_{20}$-alkyl radical, a phenyl radical or a naphthyl radical.

3. A copolymer as claimed in claim 1, in which $R^1$ and $R^2$ are each a hydrogen atom.

4. A copolymer as claimed in claim 1, in which U is a $C_6$- to $C_{10}$-alkyl group, a $C_6$-cycloalkyl group, a phenyl radical or a silyl group of the general formula —$(CH_2)_x$-Si)R', R", R''') where x=1 and R', R" and R''', independently of one another, are $C_1$- to $C_5$-alkyl groups.

5. A copolymer as claimed in claim 1, in which V is a $C_2$- to $C_6$-hydrocarbon radical.

6. A copolymer as claimed in claim 2, in which Z is a dicyanomethylene, alkoxycarbonylcyanomethylene, cyanoimino or alkoxycarbonylimino group.

7. A copolymer as claimed in claim 1, in which m:n=20:80 to 50:50.

8. A NLO polymer material comprising a crosslinked reaction product of a nonlinear-optically active copolymer having crosslinkable, free phenolic hydroxyl groups as claimed in claim 1 with at least one functionalized crosslinker.

9. A NLO polymer material as claimed in claim 8, in which 1/n gram equivalent of the n-functional crosslinker is used per gram equivalent of crosslinkable free hydroxyl groups of the nonlinear-optically active copolymer.

10. A NLO polymer material as claimed in claim 8, in which the crosslinker is a bi- or oligo-functionalized glycidyl ether, a bi- or oligo-functionalized isocyanate or isothiocyanate, or a bifunctional anhydride together with a nonvolatile oxirane derivative.

11. A NLO polymer material as claimed in claim 10, in which the crosslinker is bisphenol A bis(glycidyl ether).

12. A NLO polymer material as claimed in claim 10, in which the crosslinker is p-phenylenediisocyanate.

13. A NLO polymer material as claimed in claim 10 having no glass transition temperature up to 300° C.

14. A NLO polymer material as claimed in claim 10 having $r^{33}$- value of at least 20 $\mu$m/V.

15. An electrooptical or photonic component, comprising at least one functional layer comprising a crosslinked NLO polymer as claimed in claim 8 and a support material.

16. An electrooptical or photonic component as claimed in claim 15, in which the at least one functional layer is arranged between two buffer layers.

17. An electrooptical or photonic component as claimed in claim 16, in which at least one of the buffer layers consists of a corresponding crosslinked NLO polymer like the functional layer.

18. An electrooptical or photonic component as claimed in claim 15, in which the support comprises glass, silicon, or indium tin oxide.

* * * * *